United States Patent [19]

Plescia

[11] Patent Number: 4,667,559

[45] Date of Patent: May 26, 1987

[54] BRIDGE FOR STRINGED INSTRUMENTS

[76] Inventor: Ralphael Plescia, 1048 California Ave., Salt Lake City, Utah 84104

[21] Appl. No.: 839,907

[22] Filed: Mar. 14, 1986

[51] Int. Cl.[4] .......... G01D 3/04

[52] U.S. Cl. .......... 84/309

[58] Field of Search .......... 84/307, 309

[56] References Cited

U.S. PATENT DOCUMENTS

| | | | |
|---|---|---|---|
| 642,416 | 1/1900 | Beetem | 84/309 |
| 1,783,117 | 11/1930 | Gosparlin | 84/309 |
| 1,852,509 | 4/1932 | Dolan | 84/309 |
| 2,343,384 | 3/1944 | McDonald | 84/309 |
| 2,446,267 | 8/1948 | Gahn | 84/309 |

FOREIGN PATENT DOCUMENTS

| | | | |
|---|---|---|---|
| 182622 | 7/1922 | United Kingdom | 84/309 |

*Primary Examiner*—Michael L. Gellner

*Assistant Examiner*—Brian W. Brown

*Attorney, Agent, or Firm*—Thorpe, North & Western

[57] ABSTRACT

An improved bridge for stringed instrument comprising a single, integral bridge body having a bridge crown formed of two alternating sections. The first section comprises the string support column with a groove at the top thereof for positioning the strings of the instrument at appropriate levels above the fingerboard. The second section of the crown comprises a (i) fluted portion and (ii) contiguous web support member disposed between two adjacent string support columns. Improved transfer of vibrational energy from the strings of the instrument occurs through the string support columns which have longer grooves providing for increased string contact. The intermediate fluted portion and web operate to more effectively transfer vibrational energy toward the base of the bridge for transfer into the resonating body of the instrument.

10 Claims, 5 Drawing Figures

BRIDGE FOR STRINGED INSTRUMENTS

BACKGROUND OF THE INVENTION

1. Field of the Invention:

This invention pertains to that portion of a stringed instrument referred to as the bridge. More specifically, the present invention relates to an improvement in the design configuration of the bridge which develops improved sound transfer into the resonant body of the instrument.

2. Prior Art:

The bridge of stringed instruments has long been the focus of design innovation with the objective of improving sound transfer into the body of the instrument. It is generally believed that the bridge, sound post (positioned within the body of the instrument) and the instrument body itself constitute the critical parts of sound generation in such instruments as violins, violas, cellos, guitars, banjos, etc.

A great variety of bridge design has developed and is represented by the following patents U.S. Pat. No. 1,783,117 by Gosparlin and U.S. Pat. No. 2,446,267 by Dahn show conventional F-holes slightly modified to improve sound transfer. U.S. Pat. No. 642,416 by Beetem illustrates a multi-piece bridge in which each string is separately supported by a post. U.S. Pat. No. De. 43,358 by Goodyear depicts an artistic design for a bridge having separate columns or support members for each stringed instrument mounted on a common base. U.S. Pat. No. 1,852,509 by Dolan proposes a bridge that suspends the strings on a support cord journalled across support columns on the bridge. Finally U.S. Pat. No. 2,343,384 by McDonald discloses curved fingers that project upward to support individual strings, each finger being tailored in size to relate to the depth of pitch for the intended string.

Although the extremes of design represented by the above cited patents suggest many directions of innovation, virtually all commercial bridge design has retained the traditional configuration of a single, integral body having F-holes within the bridge body and having an uninterrupted crown of moderate curvature to support the strings. Typical of the traditional bridge is that configuration shown in FIGS. 1 and 2 and identified as prior art structure. These particular bridges are configured for a cello, but are representative of bridges useful for stringed instruments of the violin family.

The bridge body 10 includes a single, integral structure having front 11 and back 12 faces and a bridge crown 13 for supporting the strings of the instrument in proper relation to a finger board. Typically, small grooves 14 are cut into the crown 13 to stabilize the taut string in proper position F-holes 15 and 16 are cut through the bridge structure to reduce the amount of mass in the body of the bridge As noted from FIG. 1, the crown 13 is narrow at the top 16 and diverges to a thicker structure toward the base or feet 18 of the bridge.

Attempts to improve sound transfer from the strings into the resonating body have been unable to capture the g interest of most musicians, who remain traditionally committed to the bridge style as represented by FIGS. 1 and 2. Furthermore, the various innovations illustrated in cited prior art patents have failed to develop the full tonal response required from the stringed instrument.

OBJECTS AND SUMMARY OF THE INVENTION

It is therefore an object of the present invention to provide a traditional style bridge for a stringed instrument which has modifications for enhancing sound transfer into the resonating body. g It is a further object of this invention to provide a bridge which captures greater amount of vibration from the supported strings for transfer into the resonating body.

These and other objects are realized in an improved bridge configuration comprising a single integral bridge body having front and back faces and a bridge crown for supporting strings of the instrument in proper relation to the fingerboard. The crown of the bridge is formed of two alternating sections. The first section comprises a string support means or column positioned at appropriate heights above the fingerboard level of the instrument. The second section of the crown comprises (i) a substantially vertical fluted portion and (ii) a contiguous substantially vertical web support member disposed between two adjacent string support means. The web member is formed by deletion of bridge material from the front or back face of the bridge between the adjacent strings to thereby form a fluted portion. The flute has its greatest depth and the web member has its least thickness at the crown of the bridge, with the web thickness diverging to a greater thickness downward therefrom. The string support means or column includes a groove adapted to journal a taut string in stable position. Shoulder sections are provided on each side of the groove to give strength to groove structure under the force of the strings of the instrument.

The greater thickness of the string support means in a column-like configuration provides for improved transfer of vibrational energy from the string into the bridge, and consequently into the resonating body. The fluted sections between the respective strings enhance the extent of transfer of vibrational energy from the strings into the resonant body.

Other objects and features of the present invention will be apparent to those skilled in the art based on the detailed description, in combination with the accompanying drawings.

DETAILED DESCRIPTION OF THE INVENTION

Figure 1:
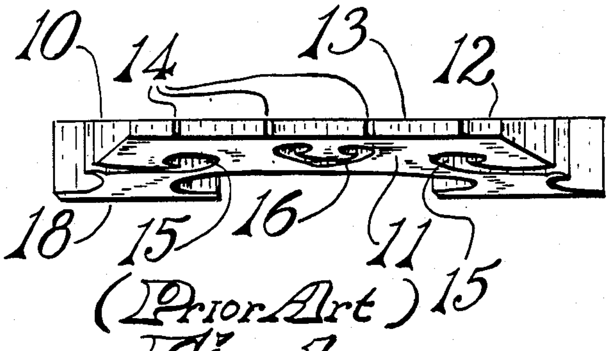
(Prior Art) Fig 1
FIG. 1 shows a top plan view of a cello bridge constructed in accordance with prior art teachings.
Figure 3:
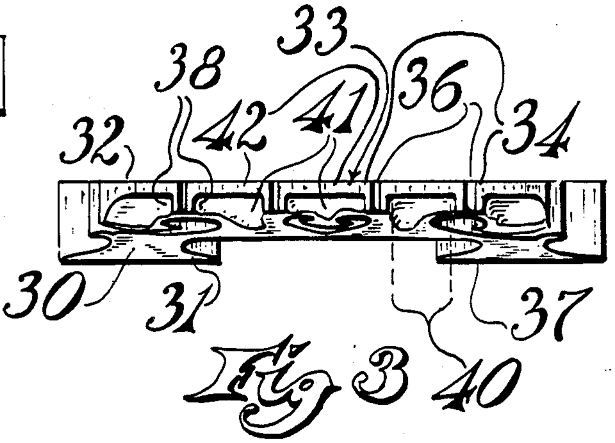
FIG. 3 illustrates a modified bridge in accordance with the principles of the present invention, shown in top, plan view.
Figure 2:
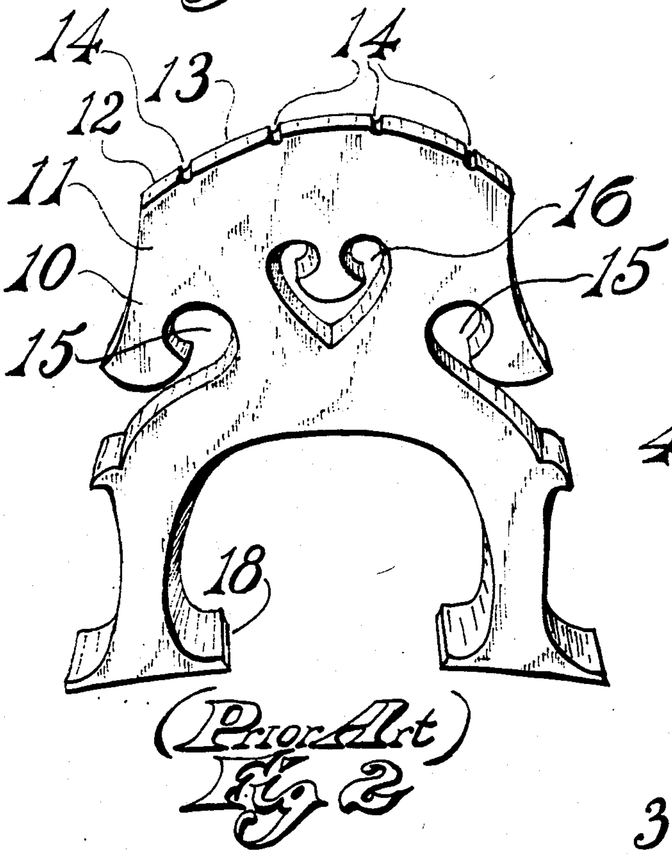
(Prior Art) Fig 2
FIG. 2 shows a front perspective view of a cello bridge as illustrated in FIG. 1, representing prior art teachings.
Figure 4:
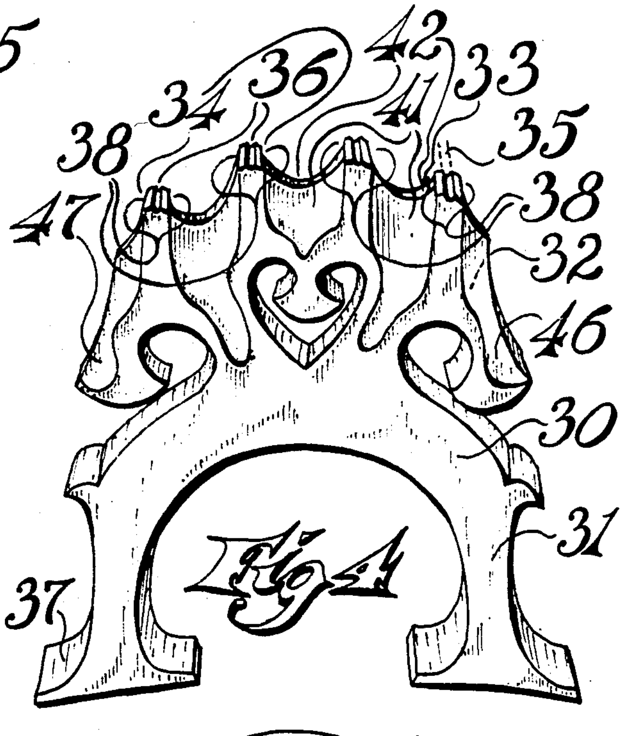
FIG. 4 is a front perspective view of the improved cello bridge illustrated in FIG. 3.

FIG. 4 shows a single, integral bridge body 30 which adopts the traditional bridge configuration but incorporates structural modifications which greatly enhance the vibrational transfer of string vibrations into the resonating body of the instrument. The illustration in FIG. 3 shows the same bridge as it would appear in position on the resonating face of a cello, looking down in perpendicular orientation to the face of the instrument.

The bridge includes front 31 and back 32 faces and a bridge crown 33 having string support means 34 for positioning and retaining the strings at properly spaced distances with respect to adjacent strings and above an instrument fingerboard level (not shown).

The crown 33 of the bridge is formed of two alternating sections. The first section comprises the string support means 34 which have an appearance of column-like structure for supporting individual strings 35 in a groove 36 at the head of the column. This string support means 34 diverges from the narrow head or crown downward toward the feet 37 of the bridge. This diverging structure represents the primary vibrational transfer path from the strings to the instrument body.

The head or top portion of the string support means 34 is preferrably of greater thickness than a conventional bridge crown. This permits the groove 36 to have increased contact at the bridge for improved transfer of vibrational energy. With the string 35 drawn in taut condition at the groove 36 vibrational energy is introduced into the bridge over a greater length of the string (representing that portion of the string journaled in groove 36). The top or head of the support column 34 includes a shoulder section 38 at each side of the groove 36 to give strength to resist string tension and failure of the bridge material. The width of such shoulder sections 38 is minimized to that size sufficient to support the groove structure under stress of the taut string. Lesser shoulder widths tend to increase the degree of vibrational transfer into the bridge structure and contacting resonating body.

Figure 5:
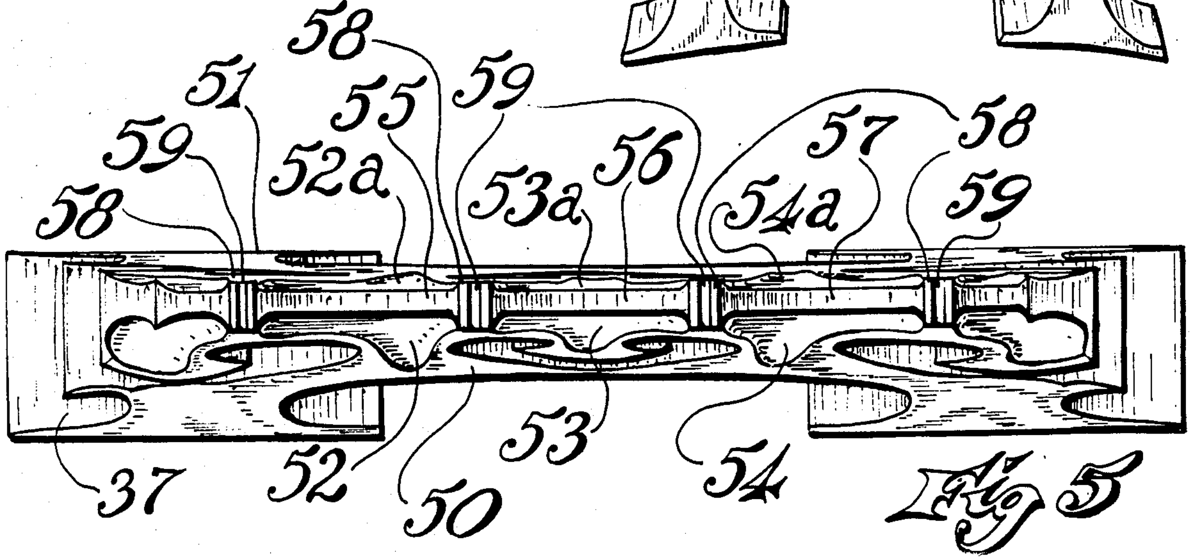
FIG. 5 shows a top view of an additional embodiment of a bridge modified in accordance with the present invention.

The second section of the crown 33 comprises that portion of structure 40 interposed between adjacent string support means or columns 34 (see FIG. 3). This second section is made up of two parts. The first part is a substantially vertical fluted portion or open space 41 which forms an opening or gap between each of the respective support columns 34. The second part comprises a contiguous web support member 42 disposed between the two adjacent string support means or columns 34. This web portion maintains the integral structure of the total bridge, reinforces the support columns and appears to have some favorable affect toward channeling vibrational transfer to the base of the bridge. In practice, this web support member and contiguous fluted portion are formed from a bridge body whose thickness in its upper section corresponds to the thickness of the grooves 36 and the subordinate support structure 34. The craftsman cuts or removes the fluted portion 41, leaving the web member 42 as connecting material between the string supports. This deletion of bridge material to form the fluted portion may be from either the front or back face, or may be from both faces as shown in FIG. 5. It should be noted that the flute has its greatest depth at the top of the crown, where the web member has its least thickness. The web member diverges to a greater thickness as one progresses down the bridge from the top crown toward the bridge feet 37. Correspondingly, the thickness of the flute decreases along this same vertical path. Accordingly, the respective web support member and fluted portion provide reinforcement between support columns and channeling of vibrational transfer toward the base of the bridge.

The relationship of the web support member and contiguous fluted portion are clearly interrelated, the fluted portion being that volume of the web support structure which has been deleted or cut away.

The inventor has discovered that by extending the fluted portion of the bridge downward from a top portion of the crown at least one-tenth the distance to the feet of the bridge results in significantly improved performance of the instrument. The most preferred performance occurs where the fluted portion of bridge extends approximately one-fourth the distance from the crown to the feet of the bridge. The depth of the cut for the flute at the top of the crown should be at least one-third the thickness of the contiguous web member. Accordingly, if the web member is approximately three millimeters in thickness, the depth of the flute should be at least one millimeter at the top of the crown. In the preferred embodiment, the depth of the flute at the top of the crown is approximately equal to the thickness of the contiguous web member, or even deeper. The limiting factor on depth appears to primarily be subject to the requirement for strength and reinforcement in the bridge string support structure. Generally, the fluted portion of the bridge should extend downward from the top of the crown to a distance at least approximately equal to the distance separating the two adjacent strings. With respect to the lateral dimension of the flute at the top of the crown, at least two-thirds of the distance adjacent strings should comprise the fluted opening or gap. Greater width of the fluted portion will further enhance vibrational transfer and tonal response of the instrument.

As noted from the figures, the fluted portion 41 may be applied from either side of the bridge structure. For example, FIG. 5 shows a modified bridge wherein both the front 50 and back 51 faces have been cut away to form fluted structure 52, **52*a*, 53, 53*a* and 54, 54*a*formed in opposing relationship between the respective web portions 55, 56 and 57. Again, the string support means or column 58 is given greater thickness to increase the amount of string contact at groove 59** at each of the string support columns.

It should also be noted that lateral sides 46 and 47 may also be fluted as illustrated in FIG. 4 to further enhance the performance of the bridge. The inventor has also discovered that a concave crown configuration 42 helps to intensify transfer of vibrational energy into the support columns 34. The depth of this arcuate cut must be balanced with the need for strength and reinforcement to the string support structure. Thinner web members require less arcuate depth while thicker web structure performs best with deeper concave crowns 42 between the respective support members 34.

It will be apparent to those skilled in the art that other variations of the inventive principle set forth herein may be applied to the variety of bridge structures available. Accordingly, the specific embodiments presented herein are not to be construed as limiting.

I claim:

1. An improved bridge for a stringed instrument comprising:
   - a single, integral bridge body having front and back faces and a bridge crown for supporting strings of the instrument in proper relation to a fingerboard, the crown having string support means for positioning and retaining the strings at properly spaced distances with respect to adjacent strings and above an instrument fingerboard level;

the crown of the bridge being formed of two alternating sections wherein the first section comprises the string support means positioned at appropriate heights above the fingerboard level;

the second section of the crown comprising (i) a substantially vertical fluted portion and (ii) a contiguous substantially vertical web support member disposed between two adjacent string support means, the web member being formed by deletion of bridge material from the front or back face of the bridge between the adjacent strings to thereby form the fluted portion, the flute having its greatest depth and the web member having its least thickness at the crown of the bridge, the web thickness diverging to a greater thickness downward from the crown;

the string support means including a groove adapted to journal a taut string therein and shoulder sections on each side thereof to give strength to the groove, the length of the groove being substantially equal to the combined thickness of the flute and web sections of the crown.

2. An improved bridge as defined in claim 1, wherein the fluted portion of the bridge extends downward from a top of the crown at least one-tenth the distance to the feet of the bridge.

3. An improved bridge as defined in claim 2, wherein the fluted portion of the bridge extends downward from a top of the crown approximately one-fourth the distance to the feet of the bridge.

4. An improved bridge as defined in claim 1, wherein the depth of the flute at the top of the crown is at least one-third the thickness of the contiguous web member.

5. An improved bridge as defined in claim 4, wherein the depth of the flute at the top of the crown is approximately equal to the thickness of the contiguous web member.

6. An improved bridge as defined in claim 1, wherein the fluted portion of the bridge extends downward from a top of the crown to a distance at least approximately equal to the distance separating the two adjacent strings.

7. An improved bridge as defined in claim 1, wherein the fluted portion has a width at the top of the crown at least two thirds the distance between the two adjacent strings

8. An improved bridge as defined in claim 1, wherein the shoulder sections have a minimal width sufficient to support groove structure and to maximize width of the flute portion of the crown.

9. An improved bridge as defined in claim 1, wherein both front and back faces of the bridge include opposing fluted portions formed between adjacent string support means, the web member being formed between the opposing fluted portions.

10. An improved bridge as defined in claim 1, wherein a top crown of each respective web member is formed in a concave configuration below and between top portions of the string support members.

* * * * *